(No Model.)

T. W. PRIOR.
DEVICE FOR HOLDING STEAM PIPES, &c.

No. 325,767. Patented Sept. 8, 1885.

Witnesses:

S. B. Brewer,
J. W. Prior

Inventor:
Thos. W. Prior,
by
William N. Low,
Attorney.

UNITED STATES PATENT OFFICE.

THOMAS W. PRIOR, OF ALBANY, NEW YORK.

DEVICE FOR HOLDING STEAM-PIPES, &c.

SPECIFICATION forming part of Letters Patent No. 325,767, dated September 8, 1885.

Application filed January 8, 1885. (No model.)

*To all whom it may concern:*

Be it known that I, THOMAS W. PRIOR, of the city and county of Albany, in the State of New York, have invented a new and useful Device for Holding Steam-Pipes, &c., of which the following is a specification.

My invention relates to a device for securing water-pipes or other similar conductors to the walls and ceilings of buildings; and the object of my invention is to facilitate the work of putting pipes in buildings; and to this end my invention consists of a grooved fastening-plate, which is designed to be secured in place at proper intervals along the line in which the pipes are to be erected, in combination with an open clamp which reaches around the pipe, and is provided with flanges adapted to slide into the groove of the fastening-plate and support a pipe in its place.

Figure 1:
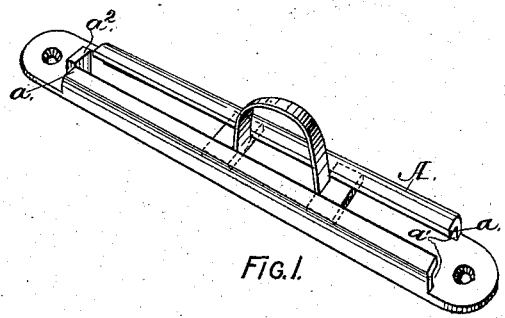
Figure 2:
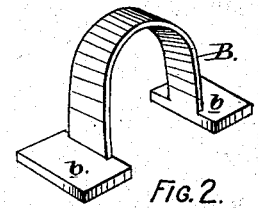
Figure 3:
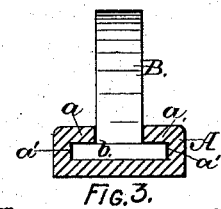

In the accompanying drawings, which form part of this specification, Figure 1 is a perspective view of the fastening device; Fig. 2, a perspective view of the clamp-piece; Fig. 3, a transverse section of the grooved fastening-plate with a clamp-piece shown in elevation, and Fig. 4 a front elevation of the fastening device with two pipes secured in place.

As represented in the drawings, A is the fastening-plate, made in an oblong form, of sufficient length to receive one or more pipes, and provided with inturned side flanges, $a$, by which a longitudinal T-shaped groove, $a'$, or its equivalent, is formed. Said fastening-plate is also provided with suitable holes for receiving screws, by which it is secured in place, and with a stop, $a^2$, for a purpose hereinafter explained.

The clamp-piece B is made in the form of an inverted-U-shaped arch, open on its lower side. Said arch is made of proper width to slide freely between the flanges $a$ of the fastening-plate, so that its opening will stand transversely to the groove $a'$ of said fastening-plate, as shown in Fig. 1, and with sufficient opening to fit around one side of the pipe it is required to secure. The lower end of each limb of the clamp-piece is provided with a flange or foot, $b$, which projects laterally to form side flanges that will project in a line with the opening through the arch, so as to engage under the flange $a$ of the fastening-plate.

The fastening-plate A is first secured to the wall or ceiling in a position where its length will stand at right angles across the line or lines of pipes, it being understood that it can be used with equal facility for pipes running either on side walls or ceilings, and whether the pipes are run in either horizontal or vertical directions. After the fastening-plates A are secured at the required places the pipes are put up and secured in place by fitting the clamp-pieces B over the pipe, and then sliding the flanges $b$ into the grooves $a'$ of the fastening-plate, whereby the pipe will be held in position. When the fastening-plate A is fixed in a vertical position, the end provided with the stop $a^2$ should be placed downward, so that the flange of the clamp-piece will bear against said stop and sustain the weight of the pipes.

Figure 4:
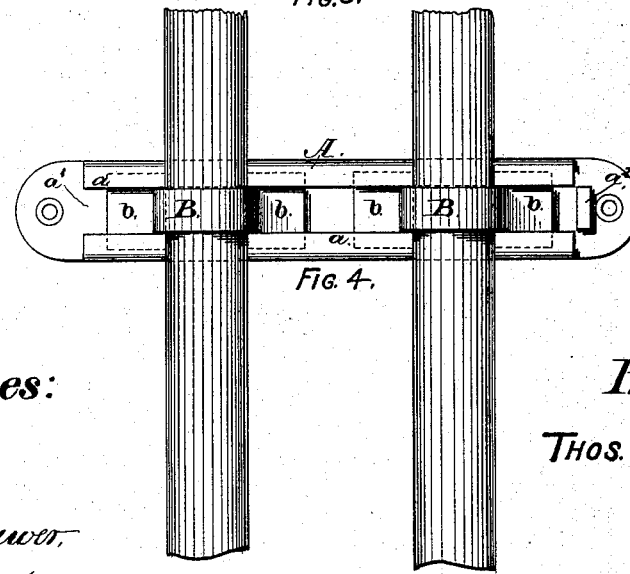

By arranging the opening of the arch-pieces to range transversely to the groove $a'$ of the fastening-plate two pipes, as shown in Fig. 4, or a greater number of adjacent pipes, may be secured by the use of a single grooved fastening plate A.

I claim as my invention—

The combination, with a longitudinally-grooved fastening-plate, A, provided with inturned side flanges, $a$, of the arch-piece B, provided with flanges $b$, which project laterally to engage under the flanges $a$ of the fastening-plate, so that the opening through said arch-piece will range transversely to the groove $a'$, as and for the purpose herein specified.

THOMAS W. PRIOR.

Witnesses:
 WM. H. LOW,
 S. B. BREWER.